(12) United States Patent
Ziminsky et al.

(10) Patent No.: US 8,181,891 B2
(45) Date of Patent: May 22, 2012

(54) MONOLITHIC FUEL INJECTOR AND RELATED MANUFACTURING METHOD

(75) Inventors: Willy Steve Ziminsky, Greenville, SC (US); Thomas Edward Johnson, Greenville, SC (US); Benjamin Lacy, Greenville, SC (US); William David York, Greenville, SC (US); Christian Xavier Stevenson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 472 days.

(21) Appl. No.: 12/555,129

(22) Filed: Sep. 8, 2009

(65) Prior Publication Data

US 2011/0057056 A1 Mar. 10, 2011

(51) Int. Cl.
*B05B 1/14* (2006.01)
*B05B 15/00* (2006.01)
*F02C 1/00* (2006.01)

(52) U.S. Cl. ..... 239/430; 239/132; 239/429; 239/533.2; 239/558; 60/737

(58) Field of Classification Search .................. 239/132, 239/132.3, 427, 429–431, 433, 463, 533.2, 239/548, 553, 553.3, 557, 558, 590, 590.3; 60/723, 737, 738, 740, 742, 747
See application file for complete search history.

(56) References Cited

U.S. PATENT DOCUMENTS

| | | | | |
|---|---|---|---|---|
| 4,100,733 | A * | 7/1978 | Striebel et al. | 60/39.463 |
| 4,966,001 | A | 10/1990 | Beebe | |
| 5,170,942 | A * | 12/1992 | Spink et al. | 239/427.3 |
| 6,442,939 | B1 * | 9/2002 | Stuttaford et al. | 60/737 |
| 6,460,345 | B1 * | 10/2002 | Beebe et al. | 60/777 |
| 6,955,023 | B2 | 10/2005 | Rotheroe | |
| 6,983,600 | B1 * | 1/2006 | Dinu et al. | 60/737 |
| 7,003,958 | B2 * | 2/2006 | Dinu et al. | 60/737 |
| 7,007,478 | B2 | 3/2006 | Dinu | |
| 7,093,438 | B2 | 8/2006 | Dinu et al. | |
| 2007/0141375 | A1 | 6/2007 | Budinger et al. | |
| 2010/0031662 | A1 * | 2/2010 | Zuo | 60/740 |

OTHER PUBLICATIONS

"Aus-tech, Direct Tooling Technology Using Direct Metal Laser Sintering (DMLS)", http://www.manufacturelink.com.au/news/view/direct-metal-laser-sintering-direct-tooling, Apr. 23, 2009, 3 pp.
"Selective Laser Sintering Functional Prototypes and Production Parts in One Day", Harbec Plastics, Inc., http://www.harbec.com/selective_laser_sintering.html, Apr. 23, 2009, 4 pp.

(Continued)

*Primary Examiner* — Darren W Gorman
(74) *Attorney, Agent, or Firm* — Nixon & Vanderhye, P.C.

(57) ABSTRACT

A monolithic fuel injection head for a fuel nozzle includes a substantially hollow vesicle body formed with an upstream end face, a downstream end face and a peripheral wall extending therebetween, an internal baffle plate extending radially outwardly from a downstream end of the bore, terminating short of the peripheral wall, thereby defining upstream and downstream fuel plenums in the vesicle body, in fluid communication by way of a radial gap between the baffle plate and the peripheral wall. A plurality of integral pre-mix tubes extend axially through the upstream and downstream fuel plenums in the vesicle body and through the baffle plate, with at least one fuel injection hole extending between each of the pre-mix tubes and the upstream fuel plenum, thereby enabling fuel in the upstream plenum to be injected into the plurality of pre-mix tubes. The fuel injection head is formed by direct metal laser sintering.

15 Claims, 5 Drawing Sheets

OTHER PUBLICATIONS

"Direct Metal Laser Sintering (DMLS)", crdm, Excellence in Rapid Product Development, www.crdm.co.uk, Apr. 23, 2009, 2 pp.

"Direct Metal Laser Sintering of Production-Quality Parts", http://www.machinebuilding.net/ap/a0035.htm, Apr. 23, 2009, 4 pp.

"Direct Metal Laser Sintering vs. Conventional Tool, Part Two", Moldmaking Technology, http://www.moldmakingtechnology.com/articles/0209addfab1.html, Apr. 23, 2009, 2 pp.

"Direct Metal Laser Sintering of Metal Parts", Plunkett Associates Limited, http://www.plunkettassociates.co.uk/parts-metal-laser-sintering.asp, Apr. 23, 2009, 2 pp.

"Selective Laser Sintering", Castle Island's Worldwide Guide Rapid Prototyping, http://home.att.net/~castleland/sls_int.htm, Apr. 23, 2009, 2 pp.

"Formula 1 and Aerospace", DMSL—Direct Metal Laser Sintering, http://www.3trpd.co.uk/dmls/formula-1-aerospace.htm, Apr. 23, 2009, 2 pp.

* cited by examiner

MONOLITHIC FUEL INJECTOR AND RELATED MANUFACTURING METHOD

This invention was made with Government support under Contract No. DE-FC26-05NT42643, awarded by the Department of Energy. The Government has certain rights in the invention.

This invention relates to a monolithic gas turbine fuel injection head for a gas turbine fuel injection nozzle, and to a method for producing the fuel injection head.

BACKGROUND OF THE INVENTION

Certain current gas turbine fuel injection nozzles contain many small combustion air tubes, trapped between upstream and downstream plates and surrounded by a peripheral wall, forming a pressure vesicle. The tubes typically include a plurality of very small, low-angle, holes within the walls of the tubes for injecting fuel from the vesicle in to the interior of the tubes where the fuel and air are mixed before exiting the tubes and entering the combustion chamber. A fuel injection nozzle of this type is disclosed in commonly-owned U.S. Pat. No. 7,007,478 issued Mar. 7, 2006.

It will be appreciated that fuel injection nozzles as described above necessarily incorporate many braze joints at the tube/plate and plate/wall interfaces that are required to seal the hydrogen fuel, and that expensive EDM procedures are necessary to form the many small, low-angle fuel injection holes. In addition, intricate assembly methods are required to meet specified performance criteria. There remains a need therefore, for a process for manufacturing complex fuel nozzle geometries that reduces if not totally eliminates potentially leaky joints, and that also greatly reduces the need for post machining and/or EDM operations.

BRIEF SUMMARY OF THE INVENTION

In accordance with an exemplary but nonlimiting embodiment, the present invention relates to the use of a rapid construction method for producing a gas turbine fuel injection head. Specifically, the invention utilizes a rapid manufacturing technology known as direct metal laser sintering (DMLS) to manufacture a monolithic nozzle injection head that eliminates joints, brazing and other aspects of the prior nozzle construction. DMLS is an additive layer process that produces a metal component directly from a CAD model using a laser and a fine metal powder (e.g., cobalt and/or chrome alloy powders and Nickel-based alloy powders are especially suited for the turbine nozzle application disclosed herein, but the invention is not so limited). The CAD model is sliced into thin layers (on the order of 0.02 mm) and the layers are then reconstructed layer by layer, with the laser fusing programmed areas of each powder layer in succession to the underlying layer. The layer thickness is generally chosen based on a consideration of accuracy vs. speed of manufacture. Initially, a steel plate is typically fixed inside the machine to serve as both a support and a heat sink. A dispenser delivers the powder to the support plate and a coater arm or blade spreads the powder on the plate. The machine software controls the laser beam focus and movement so that wherever the laser beam strikes the powder, the powder melts into a solid. The process continues layer by layer until the build up is completed. The application of DMLS to the injection head of a fuel injection nozzle has solved the problems noted above. Moreover, the use of the DMLS process has enabled new design features to be incorporated into the fuel injection head of the nozzle.

Thus, in accordance with one exemplary but nonlimiting embodiment, the invention relates to a monolithic fuel injection head for a fuel nozzle comprising: a substantially hollow vesicle body formed with an upstream end face, a downstream end face and a peripheral wall extending therebetween; a center opening in the upstream end face defined by a bore extending partially through the vesicle body, the bore adapted to receive a fuel feed tube; an internal baffle plate extending radially outwardly from a downstream end of the bore, terminating short of the peripheral wall, thereby defining upstream and downstream fuel plenums in the vesicle body in fluid communication by way of a radial gap between the baffle plate and the peripheral wall, such that, in use, fuel will flow from the fuel feed tube into the downstream fuel plenum, through the radial gap and into the upstream plenum; and a plurality of integral pre-mix tubes extending axially through the upstream and downstream fuel plenums in the vesicle body and through the baffle plate, with inlets at the upstream end face and outlets at the downstream end face, with at least one fuel injection hole extending between each of the pre-mix tubes and the upstream fuel plenum, thereby enabling fuel in the upstream plenum to be injected into the plurality of pre-mix tubes.

In another aspect, the invention relates to monolithic fuel injection head for a fuel nozzle comprising a substantially hollow vesicle body formed with an upstream end face, a downstream end face and a peripheral wall extending therebetween; a center opening in the upstream end face defined by a bore extending partially through the vesicle body, the bore adapted to receive a fuel feed tube; an internal baffle plate extending radially outwardly from a downstream end of the bore, terminating short of the peripheral wall, thereby defining upstream and downstream fuel plenums in the vesicle body in fluid communication by way of a radial gap between the baffle plate and the peripheral wall, such that, in use, fuel will flow from the fuel feed tube into the downstream fuel plenum, through the radial gap and into the upstream plenum; and wherein the internal baffle plate is formed with thinned score lines on an upstream side of the baffle plate, the thinned score lines arranged in a grid pattern defining a plurality of spaces bounded by the thinned score lines; a plurality of integral pre-mix tubes extending axially through the upstream fuel plenum, through respective ones of the spaces in the baffle plate and through the downstream fuel plenum in the vesicle body with inlets at the upstream end face and outlets at the downstream end face, with at least one fuel injection hole extending between each of the air supply tubes and the upstream fuel plenum, thereby enabling fuel in the upstream plenum to be injected into the plurality of pre-mix tubes; and wherein each of the pre-mix tubes is formed with cooling fins in the downstream fuel plenum.

In still another aspect, the invention relates to a method of producing a fuel injection head comprising: (a) forming a substantially hollow vesicle body with an upstream end face, a downstream end face and a peripheral wall extending therebetween; (b) forming a center opening in the upstream end face defined by a bore extending partially through the vesicle body, the bore adapted to receive a fuel feed tube; (c) forming a plurality of integral pre-mix tubes extending axially through the hollow vesicle body, with inlets at the upstream end face and outlets at the downstream end face; and (d) forming at least one fuel injection hole extending between each of the pre-mix tubes and the hollow vesicle body; and wherein steps (a) through (d) are carried out by direct laser metal sintering.

The invention will now be described in greater detail in connection with the drawings identified below.

DETAILED DESCRIPTION OF THE DRAWINGS

Figure 1:
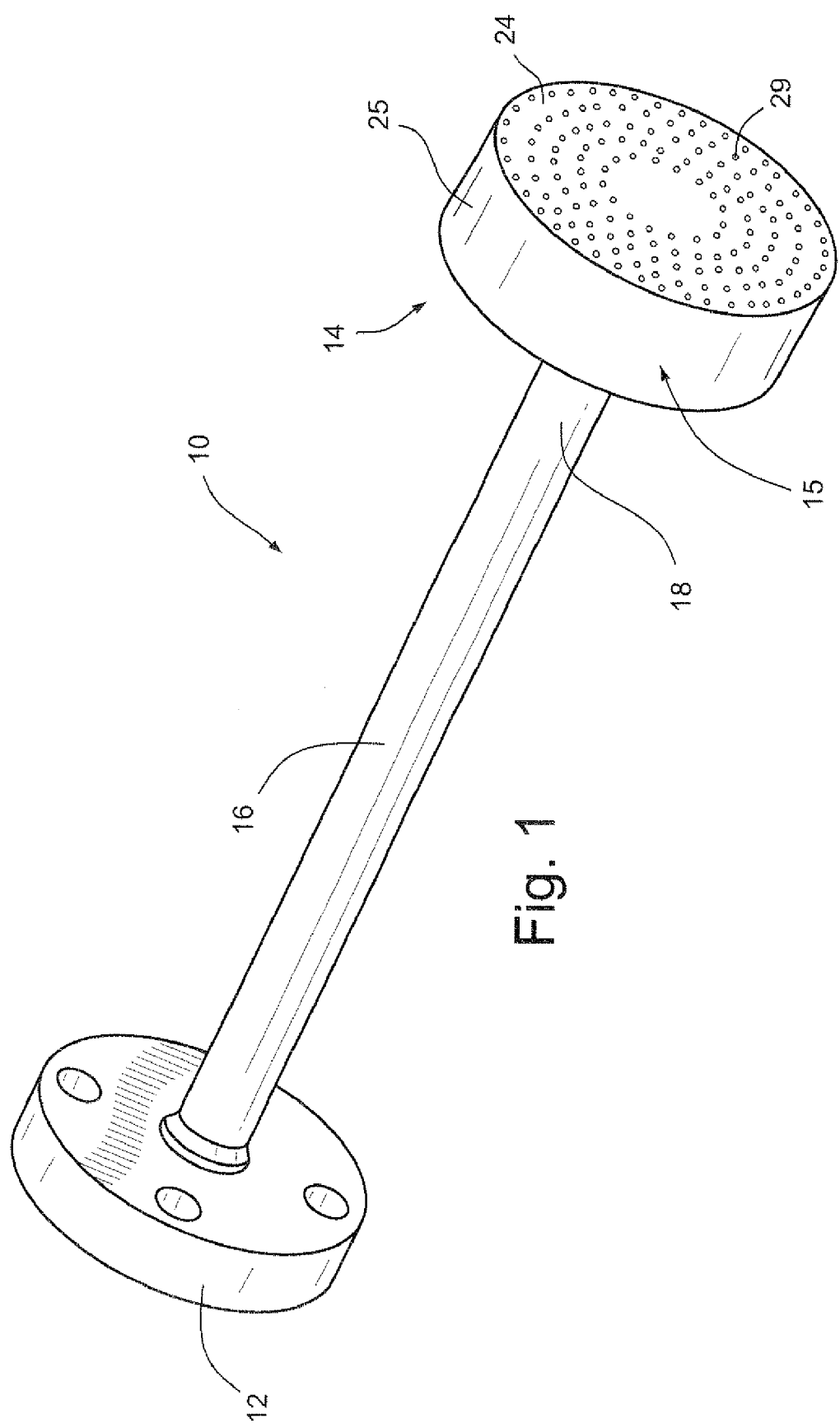
FIG. 1 is a perspective view of a fuel injection head manufactured in accordance with a first exemplary embodiment of the invention.

FIG. 1 shows a gas turbine fuel injection nozzle 10 incorporating an injection head constructed in accordance with an exemplary but nonlimiting embodiment of the invention. Specifically, the nozzle 10 includes a fuel nozzle base 12 and a fuel injection head 14 connected by a centrally-located fuel feed tube 16. The fuel injection head 14 is attached to the downstream end 18 of the fuel feed tube 16, with the leading edge of the fuel feed tube abutting an internal, annular shoulder 20 (see FIG. 2) within the center of the fuel injection head 14. Note that terms used herein such as "upstream" and "downstream" are referenced against a direction of flow of air and fuel through the fuel injector nozzle 10 and into the combustion chamber (not shown).

It will be appreciated that plural nozzles 10 are typically arranged to supply a mixture of fuel and air to the combustion chamber of a gas turbine combustor. In a known turbine configuration, an annular array of such combustors supply combustion gases to a first stage of the turbine by means of a like number of transition piece ducts (often referred to as a "can-annular" array). Typically, the nozzle bases 12 in each combustor are fixed to a combustor end cover and the fuel injection heads 14 are fixed to a forward cap assembly (neither shown) within the combustion chamber. The invention here is specifically concerned with the fuel injection head 14 and a process for forming the fuel injection head.

Figure 2:
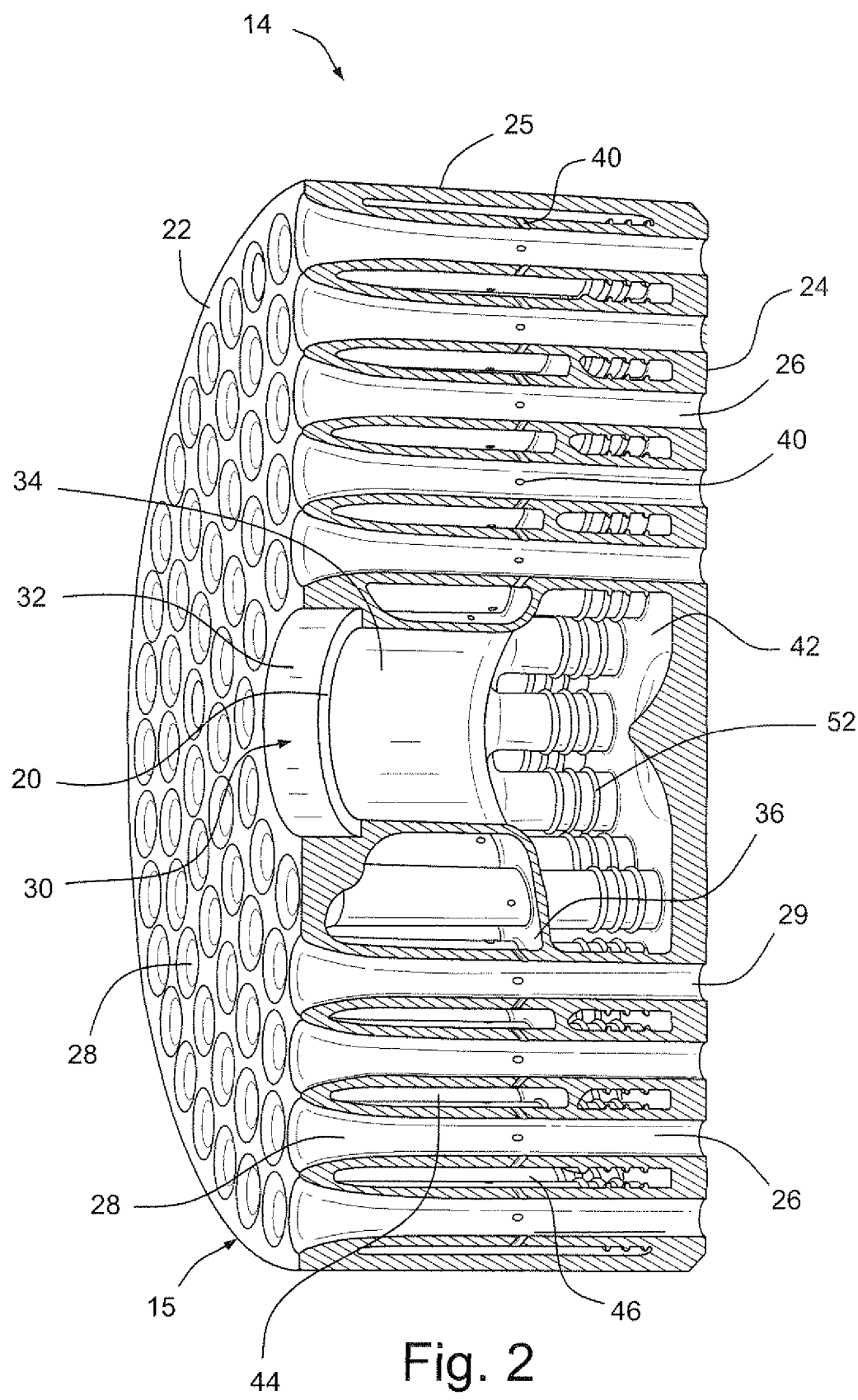
FIG. 2 is an enlarged upstream perspective view, partly sectioned, of the fuel injection head taken from FIG. 1.
Figure 3:
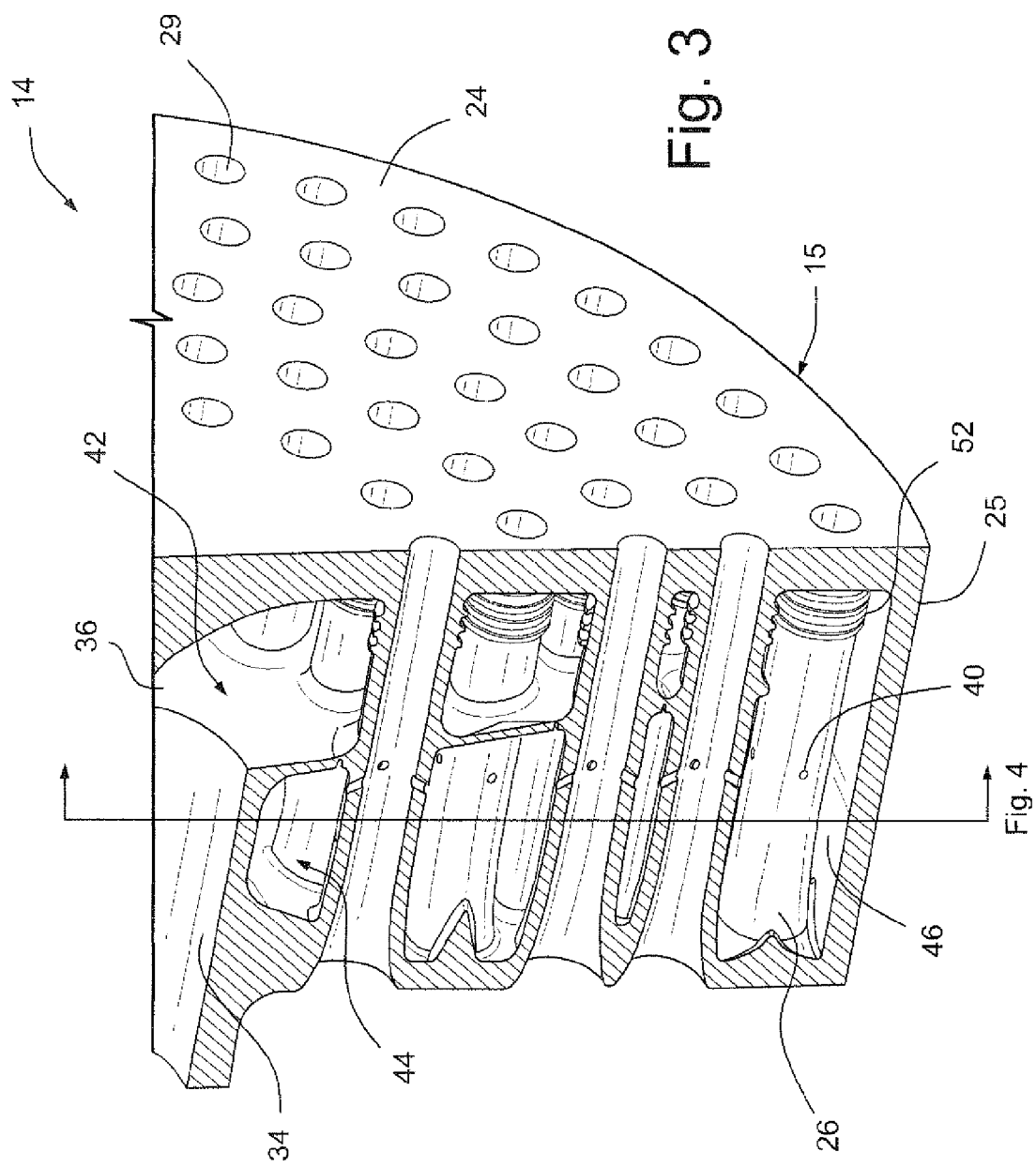
FIG. 3 is a partial downstream perspective view, also sectioned, of the fuel injection head shown in FIG. 2.
Figure 4:
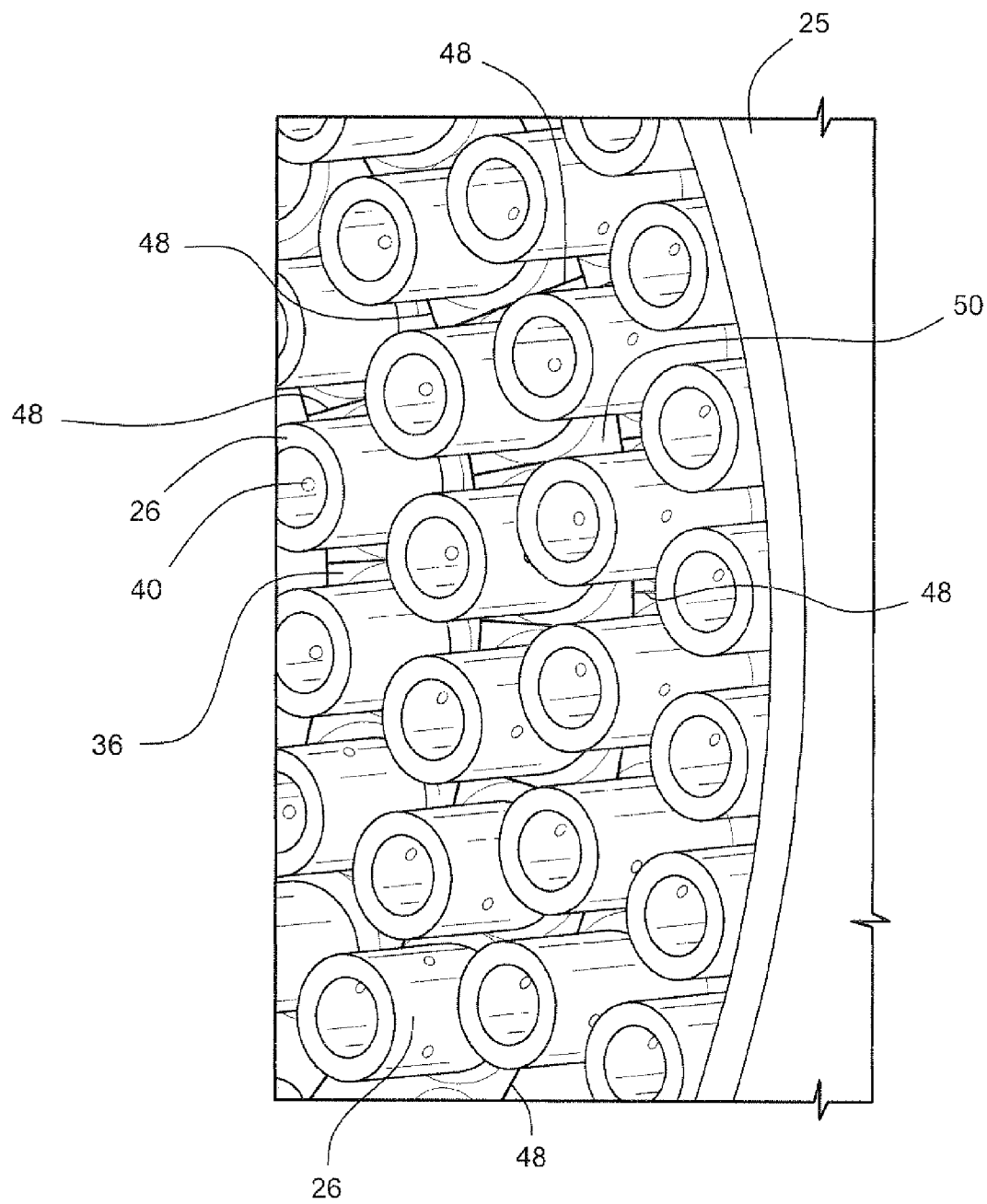
FIG. 4 is a partial internal section view of the fuel injection head, viewed from an upstream side of an internal baffle within the injection head, along the section line 4-4 in FIG. 3.
Figure 5:
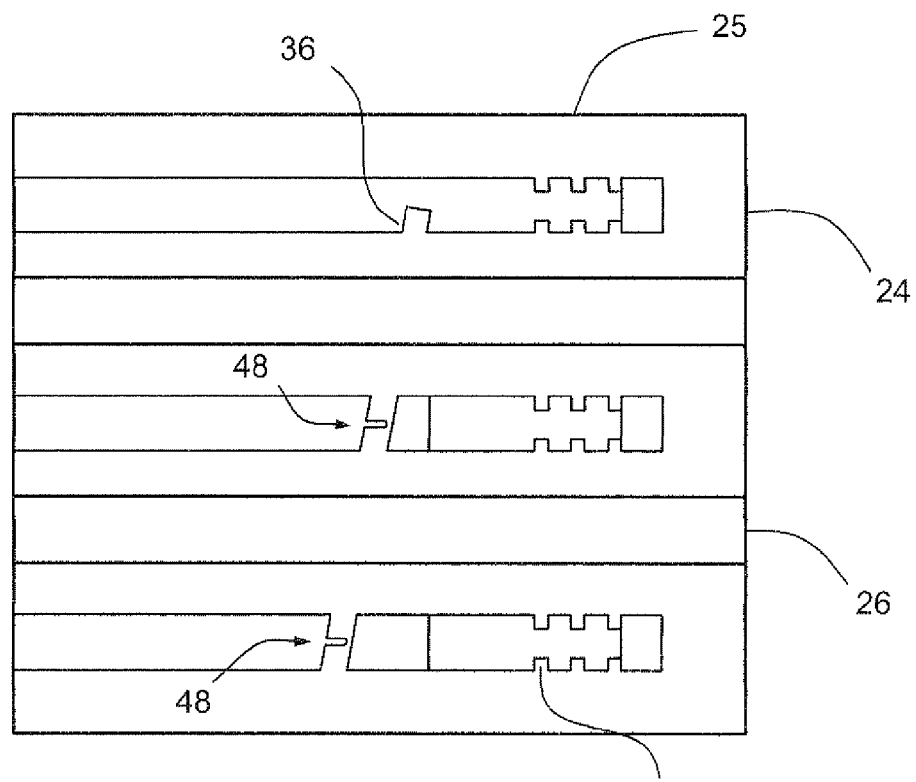
FIG. 5 is a partial schematic section of the exit or aft end of the fuel injection head.

FIG. 2 illustrates the fuel injection head 14 in greater detail. The fuel injection head 14 is formed as a partially hollow, round monolithic block or vesicle body 15 having an upstream end face 22 and a downstream end face 24, substantially parallel to one another, with an annular peripheral wall 25 axially therebetween. Internal air supply passages or tubes 26 (also referred to herein as pre-mix tubes) extend between the upstream and downstream end faces 22, 24, with the upstream ends or inlets 28 of the mixing tubes 26 flared outwardly (i.e., formed with a bell-mouth shape) to facilitate (and accelerate) the flow of air into and through the pre-mix tubes. The remaining lengths of the pre-mix tubes have a substantially uniform diameter through the downstream ends or outlets 29. The pre-mix tubes 26 may be arranged in annular, concentric rows, (See FIGS. 1 and 3) with the pre-mix tubes of any given row circumferentially offset from the pre-mix tubes 26 of an adjacent row, as best seen in FIG. 4. It will be appreciated, however, that the invention is not limited by any specific arrangement of pre-mix tubes 26 within the vesicle body. In addition, the use of the term "tubes" is for convenience, noting that these are not discrete tubes secured at opposite ends to the end faces, but, rather, internal passages incorporated within the monolithic vesicle body 15, with interior space surrounding the various passages.

The center of the fuel injection head 14 (or vesicle body 15) is open at the upstream end face 22, thus providing an inlet bore 30 (FIG. 2) defined by the annular wall 32 for receiving the fuel feed tube 16, with a counter-bored portion 34 defining the annular shoulder 20 adapted for engagement by the leading edge of the fuel feed tube 16.

Using the DMLS rapid manufacturing process has facilitated various design features incorporated into the fuel injection head disclosed herein. For example, an internal baffle plate 36 (see FIGS. 2-5) is integrally formed within the vesicle body 15. The baffle plate 36 extends radially outwardly from the downstream end of the counter bore 34 at a location substantially mid-way between the upstream and downstream end faces 22, 24, with most but not all of the pre-mix tubes "passing" therethrough. The baffle plate 36 is angled toward the downstream end face 24 in a radially outward direction, extending from the radially inner hub or wall 32 toward, but terminating short of, the outer peripheral wall 25.

At least one, and preferably an array of fuel injection holes 40 is provided in each of the pre-mix tubes 26, e.g., four in each tube, at equally-spaced locations about the circumference of the respective tube. The fuel injection holes 40 lie substantially in a common plane that is parallel to the upstream and downstream end faces 22, 24 of the vesicle body 15, and upstream of the baffle plate 36. The fuel injection holes 40 are slanted in the direction of flow, i.e. the holes are angled radially inwardly (at low acute angles relative to the centerline of the respective pre-mix tube 26) in the downstream direction so that the flow of fuel through the injection holes 40 has a velocity component in the direction of the air flowing through the pre-mix tubes 26. Note that the baffle plate 36 effectively forms a downstream fuel plenum 42 and an upstream fuel plenum 44 fluidly connected by an annular, radial gap 46 between the radially outer edge of the baffle plate and the peripheral outer wall 25.

The downstream end face 24 of the fuel injection head 14 is closed in its center region so that high pressure hydrogen fuel exiting the fuel feed tube 16 will flow into the areas between the pre-mix tubes 26 into the downstream fuel plenum area 42 and then through the radial gap 46 into the upstream plenum 44. This fuel path tends to equalize the fuel pressure at the inlet ends of the fuel injection holes 40 and thus distributes the fuel substantially uniformly to the pre-mix tubes 26.

The hydrogen fuel will then flow through the fuel injection holes 40 and into the pre-mix tubes 26 where the fuel and air will mix before exiting the fuel injection head 14 into the combustion chamber.

The DMLS process also facilitates exact location and orientation of the fuel injection holes 40. This is important because the placement of the holes 40 can have an effect on the evenness of the fuel feed pressure within the injection head. If, for example, the fuel is flowing past an injection hole 40 at high velocity, it will have a low feed pressure. If the fuel velocity is low on the other hand, it will have a high feed pressure. Similarly, if an injection hole 40 is directly opposite another injection hole in an adjacent pre-mix tube, the fuel passing the holes will have high velocity and thus low feed pressure (see FIG. 4). It has been found that rotating the location of the injection holes 40 in one pre-mix tube 45 degrees relative to the hole locations in adjacent pre-mix tubes produces the best results, and the DMLS process can be programmed to locate the holes in this manner automatically and with great precision.

Further in this regard, because hydrogen fuel is very reactive, care must be taken to ensure that the combustion flame remains downstream of the pre-mix tube outlets 29. Otherwise, if a flame erupts inside one or more of the pre-mix tubes 26, thermal expansion in the local area(s) could destroy the injection head, especially in a monolithic construction as described herein. Accordingly, it is desirable to locate the fuel injection holes 40 between about 0.500 and 0.850 inch from the pre-mix tube outlets. While locating the injection holes 40 close to the outlets 29 reduces resident mixing time, the avoidance of flame eruption within the pre-mix tubes 26 is paramount.

It is another feature of the exemplary embodiment that the baffle plate 36 is formed with an ordered array of built-in "cracks" 48, best seen in FIG. 4 and also facilitated by the DMLS process. The cracks 48 are essentially thinned score lines (although not formed by "scoring" in the traditional sense) on the upstream side of the baffle plate, arranged in a rectilinear grid-like pattern, surrounding each of the mixing tubes 26. More specifically, the grid-like pattern establishes plural closed spaces or areas 50, each bounded by the thinned score lines 48, and each having a respective one of the pre-mix tubes 26 passing through that space. The so-called cracks do not extend completely through the baffle plate, and thus there is no diversion or leakage of fuel through the plate. On the other hand, if a flame is held in one or more of the pre-mix tubes 26, the tube(s) becomes hot and grows thermally. The baffle plate 36 not only stiffens the pre-mix tubes 26, but also effectively shortens the length over which the thermal growth can be absorbed. In addition, the thinned cracks or score lines 48 in the baffle plate 36 allow the baffle plate to actually crack along these thinned score lines without doing harm to the pre-mix tubes 26.

The built-in cracks 48 are formed on the top or upstream side of the baffle plate 36 because of the DMLS build orientation. As mentioned above, when a component is built using DMLS, an underlying support structure is required. By locating the cracks or thinned score lines 48 on the upper or top side, of the baffle plate 36, no additional support is needed and the support structure that is present does not interfere with the DMLS layering process. A further advantage to using DMLS is that normally, a clearance would be required to assemble the baffle plate 36 onto the fuel feed tube 16. This usually results in some leakage past the plate, and DMLS resolves this issue by eliminating usual joint between the baffle plate 36 and the fuel feed tube 16 as well as all of the joints between the pre-mix tubes 26 and the end faces 22, 24 of the vesicle body 15.

Figure 6:
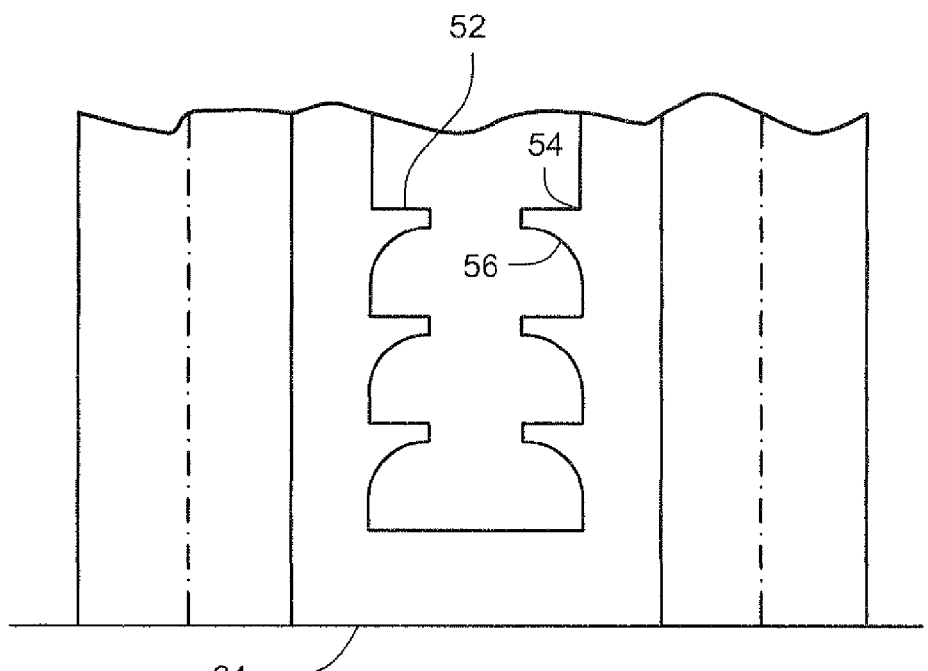
FIG. 6 is a partial section view of DMLS support structure for forming the aft end of the fuel injection head illustrated in FIGS. 1-5.

Returning to FIGS. 2 and 5 but now also referring to FIG. 6, cooling fins 52 may be formed on each pre-mix tube 26 at locations downstream of the baffle plate 36. The fins on each tube 26 are discrete parallel rings (for example, three on each tube), adjacent the downstream end face 24 of the vesicle body 15. FIG. 6 illustrates the DMLS support structure for forming the fins 52 on adjacent pre-mix tubes. Fillet radii 54 on the top sides of the fins are minimized, while fillet radii 56 on the undersides of the fins 50 are greatly enlarged to provide the desired build quality, while also resulting in a lower stress concentration factor, of critical concern in these otherwise high-stress areas.

It will thus be appreciated that using the DMLS method permits the design and construction of fuel injection nozzles that were previously not producible in a reliable or economical manner. DMLS ensures that the interfaces between the pre-mix tubes and end walls or plates are sound and do not require machining to very tight braze tolerances. The jointless manufacture is important because hydrogen molecules are very small and can leak through very small gaps that may exist if the structure contains traditional joints. DMLS virtually eliminates the potential for leaks in the many interfaces between the tubes and the upstream and downstream end faces of the injection head or vesicle body. DMLS also eliminates the need for machining the inlet bell mouth to each pre-mix tube, while permitting the complex internal baffling and cooling features described herein.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A monolithic fuel injection head for a fuel nozzle comprising:
   a substantially hollow vesicle body formed with an upstream end face, a downstream end face and a peripheral wall extending therebetween;
   a center opening in the upstream end face defined by a bore extending partially through said vesicle body, said bore adapted to receive a fuel feed tube;
   an internal baffle plate extending radially outwardly from a downstream end of said bore, terminating short of said peripheral wall, thereby defining upstream and downstream fuel plenums in said vesicle body, in fluid communication by way of a radial gap between said baffle plate and said peripheral wall, such that, in use, fuel will flow from the fuel feed tube into said downstream fuel plenum, through said radial gap and into said upstream plenum; and
   a plurality of integral pre-mix tubes extending axially through said upstream and downstream fuel plenums in said vesicle body and through said baffle plate, with inlets at said upstream end face and outlets at said downstream end face, with at least one fuel injection hole extending between each of said pre-mix tubes and said upstream fuel plenum, thereby enabling fuel in said upstream plenum to be injected into said plurality of pre-mix tubes.

2. The monolithic fuel injection head of claim 1 wherein said internal baffle plate is angled in a radially outward direction toward said downstream end face.

3. The monolithic fuel injection head of claim 1 wherein said plurality of pre-mix tubes are arranged in concentric annular rows, with pre-mix tubes in one row circumferentially offset from pre-mix tubes in an adjacent row.

4. The monolithic fuel injection head of claim 1 wherein each of said pre-mix tubes is flared outwardly at said inlets.

5. The monolithic fuel injection head of claim 1 wherein said annular bore is formed with a counter bore thereby defining an annular shoulder adapted to be engaged by a leading edge of the fuel feed tube.

6. The monolithic fuel injection head of claim 1 wherein said at least one fuel injection hole comprises four fuel injection holes substantially equally spaced about each of said pre-mix tubes.

7. The monolithic fuel injection head of claim 6 wherein each fuel injection hole is angled in a downstream direction and located between 0.500 and 0.850 inches from a respective one of said outlets.

8. The monolithic fuel injection head of claim 1 wherein each of said pre-mix tubes is formed with cooling fins in said downstream fuel plenum.

9. The monolithic fuel injection head of claim 1 wherein said internal baffle plate is formed with thinned score lines on an upstream side of said baffle plate, said thinned score lines arranged in a grid such that each pre-mix tube passing through said baffle plate is bounded by respective ones of said thinned score lines.

10. The monolithic fuel injection head of claim 6 wherein said fuel injection holes lie in a substantially common plane, and no fuel injection hole in one pre-mix tube lies directly opposite a fuel injection hole in an adjacent pre-mix tube.

11. A monolithic fuel injection head for a fuel nozzle comprising:
a substantially hollow vesicle body formed with an upstream end face, a downstream end face and a peripheral wall extending therebetween;
a center opening in the upstream end face defined by a bore extending partially through said vesicle body, said bore adapted to receive a fuel feed tube;
an internal baffle plate extending radially outwardly from a downstream end of said bore, terminating short of said peripheral wall, thereby defining upstream and downstream fuel plenums in said vesicle body in fluid communication by way of a radial gap between said baffle plate and said peripheral wall, such that, in use, fuel will flow from the fuel feed tube into said downstream fuel plenum, through said radial gap and into said upstream plenum; and wherein said internal baffle plate is formed with thinned score lines on an upstream side of said baffle plate, said thinned score lines arranged in a grid pattern defining a plurality of spaces bounded by said thinned score lines;
a plurality of integral pre-mix tubes extending axially through said upstream fuel plenum, through respective ones of said spaces in said baffle plate and through said downstream fuel plenum in said vesicle body, with inlets at said upstream end face and outlets at said downstream end face, with at least one fuel injection hole extending between each of said pre-mix tubes and said upstream fuel plenum, thereby enabling fuel in said upstream plenum to be injected into said plurality of pre-mix tubes; and
wherein each of said pre-mix tubes is formed with cooling fins in said downstream fuel plenum.

12. The monolithic fuel injection head of claim 11 wherein each cooling fin is formed with a relatively small fillet radius where the cooling fin interfaces with its respective pre-mix tube on an upstream side of the cooling fin, and a relatively large fillet radius where the cooling fin interfaces with said respective pre-mix tube on a downstream side of the cooling fin.

13. The monolithic fuel injection head of claim 11 wherein said internal baffle plate is angled in a radially outward direction toward said downstream end face.

14. The monolithic fuel injection head of claim 11 wherein said at least one fuel injection hole comprises up to four fuel injection holes substantially equally spaced about each of said pre-mix tubes.

15. The monolithic fuel injection head of claim 11 wherein each fuel injection hole is angled in a downstream direction and located between 0.500 and 0.850 inches from a respective one of said outlets.

* * * * *